(12) United States Patent
Carranco

(10) Patent No.: US 10,927,881 B2
(45) Date of Patent: Feb. 23, 2021

(54) WHEEL LOCK FOR AN AUTOMOBILE

(71) Applicant: Miguel Angel Carranco, Irving, TX (US)

(72) Inventor: Miguel Angel Carranco, Irving, TX (US)

( * ) Notice: Subject to any disclaimer, the term of this patent is extended or adjusted under 35 U.S.C. 154(b) by 194 days.

(21) Appl. No.: 16/376,335

(22) Filed: Apr. 5, 2019

(65) Prior Publication Data
US 2019/0234449 A1    Aug. 1, 2019

Related U.S. Application Data

(63) Continuation-in-part of application No. 16/035,432, filed on Jul. 13, 2018, now abandoned.

(60) Provisional application No. 62/532,374, filed on Jul. 14, 2017.

(51) Int. Cl.
*F16B 41/00* (2006.01)
*E05B 73/00* (2006.01)
*B60B 3/16* (2006.01)
*F16B 23/00* (2006.01)

(52) U.S. Cl.
CPC ............ *F16B 41/005* (2013.01); *E05B 73/00* (2013.01); *F16B 23/0007* (2013.01)

(58) Field of Classification Search
CPC .... F16B 41/005; F16B 23/0007; F16B 37/14; E05B 73/00; B60B 2900/3318; B60B 3/165
USPC .. 70/DIG. 57, 229–232, 259, 260, 225, 226, 70/222, 223; 411/910; 301/37.21, 301/37.374
See application file for complete search history.

(56) References Cited

U.S. PATENT DOCUMENTS

| | | | | |
|---|---|---|---|---|
| 1,284,761 A | * | 11/1918 | Perry | E05B 13/005 70/218 |
| 1,287,270 A | | 12/1918 | Ensign | |
| 1,565,253 A | * | 12/1925 | Butters | B60C 29/06 70/230 |
| 1,726,516 A | * | 8/1929 | Parker | B62D 43/00 70/259 |
| 1,786,201 A | * | 12/1930 | Fishback | B60R 25/00 70/231 |
| 1,821,130 A | * | 9/1931 | Wharam | B62D 43/007 70/259 |
| 1,870,427 A | * | 8/1932 | Stallings | F16B 41/005 70/231 |
| 1,875,734 A | * | 9/1932 | Hurd | B62D 43/007 70/260 |

(Continued)

*Primary Examiner* — Lloyd A Gall
(74) *Attorney, Agent, or Firm* — Aaron Peacock; Gagnon, Peacock & Vereeke P.C.

(57) ABSTRACT

A wheel lock for an automobile includes a pin tumbler lock, a cam that engages with the lock, the cam having a tab that protrudes outward therefrom, a coaxially rotatable tubular sleeve that is configured to receive the lock and the cam and that engages with the tab of the cam, the interior of sleeve defining a tab cavity that engages the tab of the cam and having a plurality of sleeve ridges thereon that are distributed and spaced evenly and a coaxially rotatable tubular core that is configured to receive the sleeve and that slidably engages therewith, the exterior of the core having a plurality of core ridges that are distributed and spaced evenly thereon that engage with the sleeve ridges of the sleeve, the interior of the core defining a threaded aperture for permitting the wheel lock to fasten onto a lug bolt.

18 Claims, 9 Drawing Sheets

(56) References Cited

U.S. PATENT DOCUMENTS

| | | | | |
|---|---|---|---|---|
| 1,937,848 A | * | 12/1933 | Shinn | F16B 41/005 70/231 |
| 2,534,446 A | * | 12/1950 | Howard | F16B 41/005 70/231 |
| 2,778,215 A | * | 1/1957 | Redmond | B60C 29/06 70/231 |
| 3,535,898 A | * | 10/1970 | Allport | F16B 41/005 70/231 |
| 3,540,245 A | * | 11/1970 | Pope | F16B 41/005 70/231 |
| 3,807,204 A | * | 4/1974 | Cucheran | B60R 25/00 70/231 |
| 3,978,698 A | * | 9/1976 | Ono | E05B 47/0038 70/165 |
| 4,302,137 A | * | 11/1981 | Hart | F16B 23/0069 411/432 |
| 4,336,698 A | * | 6/1982 | Hurd | F16B 41/005 70/165 |
| 4,406,140 A | * | 9/1983 | Wolter | F16B 41/005 70/231 |
| 4,710,082 A | * | 12/1987 | Curtis | F16B 41/005 285/89 |
| 4,742,702 A | * | 5/1988 | Swertz | F16B 23/0069 411/910 |
| 4,875,819 A | | 10/1989 | Wilkinson | |
| 4,884,422 A | * | 12/1989 | Wolter | F16B 41/005 70/165 |
| 5,097,686 A | | 3/1992 | Plumer | |
| 5,388,434 A | * | 2/1995 | Kalis | B60R 11/02 248/553 |
| 7,076,977 B2 | * | 7/2006 | Lee | E05B 27/083 411/910 |
| 7,392,674 B1 | | 6/2008 | Grote | |
| 8,016,535 B1 | | 9/2011 | Roberts | |
| 9,200,666 B1 | | 12/2015 | Cadena | |
| 2006/0228191 A1 | | 10/2006 | Ward, Jr. | |
| 2014/0169910 A1 | | 6/2014 | Winnie | |

\* cited by examiner

WHEEL LOCK FOR AN AUTOMOBILE

CROSS-REFERENCE TO RELATED APPLICATIONS

This Application is a Continuation-In-Part of application Ser. No. 16/035,432, filed Jul. 13, 2018, now abandoned, which, in turn, claims the benefit of U.S. Provisional Patent Application No. 62/532,374, filed Jul. 14, 2017, all of which are incorporated herein by reference.

BACKGROUND OF THE INVENTION

Figure 1:
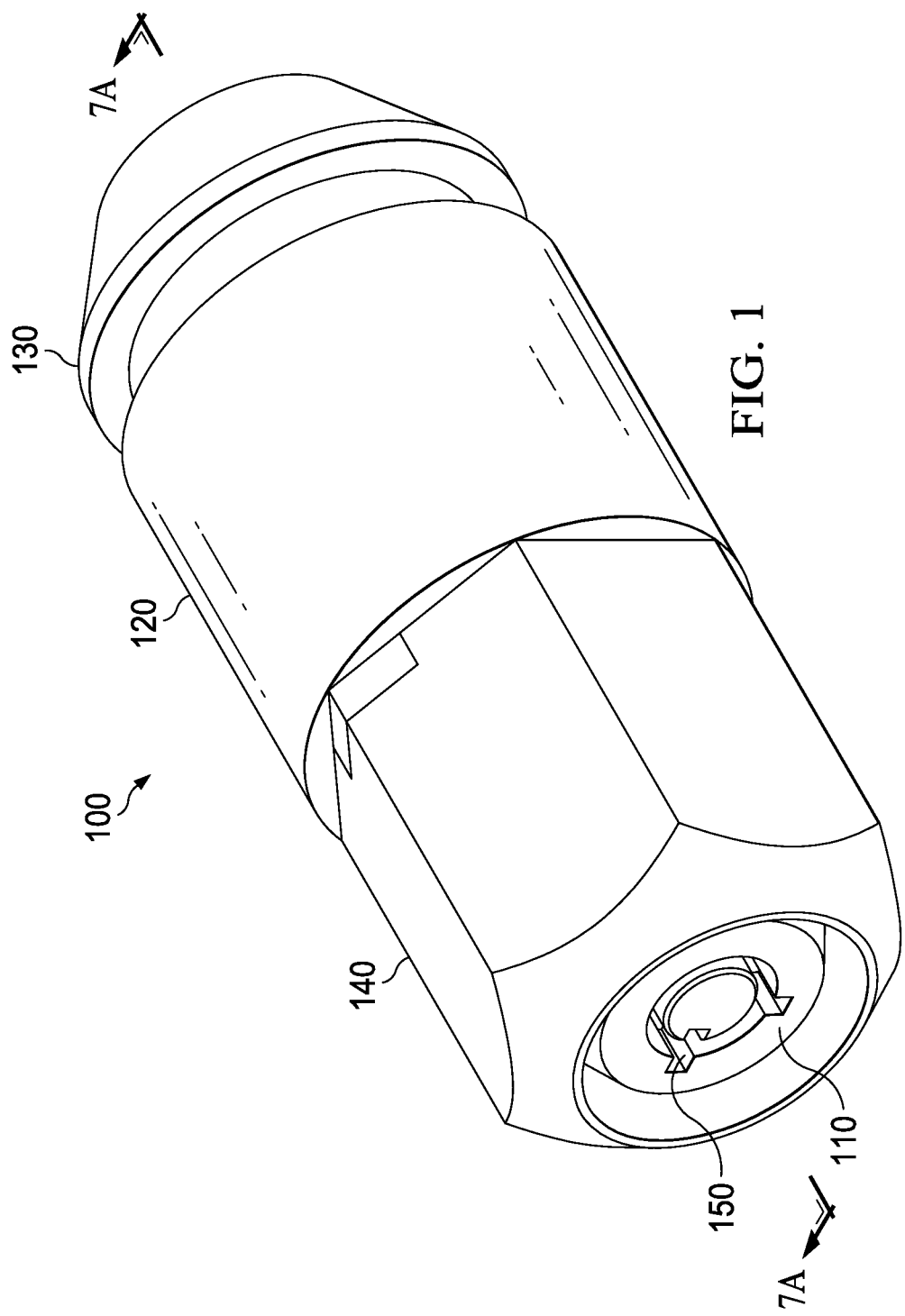
FIG. 1 is a perspective view of a wheel lock for an automobile, comprising an embodiment of the present invention.

In industrialized regions of the world, the automobile has become a vital and essential element of everyday life. While at its inception it was considered a luxury, the automobile is now commonplace—a mainstay for the ordinary person. Its prevalence has produced an array of benefits, such as an increase in utility, productivity and overall quality of life.

While the design of the automobile has changed over time, one feature has remained almost constant: the applicability, functionality, interoperability and use of the wheels and tires of an automobile. Specific innovation in the design of the wheel and of the tire have progressed, yet each still work together and are used primarily in nearly the same way as originally devised. For example, for decades, the tire has been the contact medium between the automobile and the surface of the ground; for decades, the tire has been mounted onto a wheel; for decades, the wheel has been mounted onto a part of the automobile, such as an axle. While the aesthetics of the automobile has changed through the generations, the basic function and use of wheels and of tires on an automobile have not.

Moreover, the procedure for extracting, removing and/or replacing a tire from an automobile has remained relatively unchanged throughout the decades.

Customarily, a tire is fixed to a rim, and a rim is fastened to a wheel disc—although the rim and wheel disc may be cast or pressed from a single piece of material and collectively referred to as a wheel. If a tire becomes flat or otherwise inoperable or unusable, the tire can be replaced. In so doing, lug nuts, which fasten the wheel to the automobile via lug bolts, must be loosened and unscrewed. Then, the wheel with the flat tire is removed. A wheel with the replacement/spare tire is then fastened to the automobile via lug nuts.

To remove a tire, typically a standard type of wrench, such as a lug wrench, is used to loosen and unscrew lug nuts from lug bolts. Because a standard tool is utilized, random theft can occur as any person with a standard, common tool can remove one or more tires from an automobile without the automobile owner's consent.

To combat the problem of automobile tire theft, a wheel locking device can be used and is presently used in the art. Typically, the wheel locking device is a special lug nut and key utilized with a set of standard lug nuts. The special lug nut, which has a unique shape and design, engages a standard lug wrench through a key. Thus, the special lug nut cannot readily and easily be manipulated by a standard lug wrench without the associated key. Typically, the key is two sided: one side of the key interfaces with the special lug nut and the other side of the key interfaces with a standard lug wrench. As such, the key is an intermediary between the special lug nut and the standard lug wrench. To loosen and unscrew the special lug nut from a lug bolt, a key is fitted onto the special lug nut and then a standard lug wrench is fitted onto the key. Then, torque is applied to the lug wrench to loosen, unscrew and remove the special lug nut. Once the special lug nut is unscrewed and removed, other lug nuts, if any, can be unscrewed and removed using the standard lug wrench, thereby allowing the wheel with tire to be decoupled from the automobile.

The aforementioned specially designed lug nut with associated key is essentially the current state of the art in the field for securing/locking a wheel with tire to an automobile. Many—if not most—automobile owners/users that utilize the wheel locking device described above store the specially designed key inside the automobile that is associated with the specially designed lug nut, such as in the glove box or other interior compartment. Because the specially designed key is the intermediary between the lug nut and lug wrench, it is a typically a metallic object that is too heavy and too large to carry on one's person, such as in a person's pocket, or in a purse. Further, the specially designed key is usually stored at all times in a place that is within close proximity to the automobile with which it is associated in case it is unexpectedly and immediately needed, such as in the event of a flat tire. If the specially designed key is not stored in close proximity to the automobile with which it is associated, changing a flat tire becomes problematic because the key must be retrieved before the flat tire can be removed from the automobile and a new/replacement tire installed. Thus, because of its weight and size and because of the necessity for it to be in close proximity to the automobile at all times, many automobile owners/users store the specially designed key inside the automobile.

While intended to prevent automobile tire theft, the device employed in the current art as described above has failed in many respects to stop tire theft and has also resulted in dire, unintended consequences. Thieves, knowing that the specially designed key is likely stored inside the automobile, burglarize and vandalize the automobile, looking for the key. Once the key is found—in the glove box or some other interior compartment, it is used to remove and steal one or more tires/wheels from that automobile. Thus, in the process of obtaining the specially designed key, portions of the automobile are vandalized. Consequently, the automobile's owner/user may find the automobile's window(s) smashed and/or door(s) damaged or dismantled, and one or more tires stolen.

The aforementioned locking mechanism utilized in the current art may result in more damage and costs—financial and otherwise—than if no locking mechanism is utilized at all for tires. Instead of one or more tires stolen (without a locking mechanism), now not only can one or more tires be stolen (with a locking mechanism) but the automobile can also be vandalized (windows smashed, doors damaged, etc.) in the process. Consequently, the use of the technology in the current art to lock a wheel can be more destructive to property and increase costs than its lack of use, yet its lack of use leaves an automobile's tires more vulnerable to theft.

What is needed is a device/kit for use in the automotive industry that aids in securing and locking a wheel with attached tire to an automobile. More specifically, what is needed is a device/kit that can permit a wheel with attached tire to be secured and locked to an automobile and that utilizes a standard key, such as a tubular key, which can easily be stored in a convenient location, such as on a person's body, in a purse or on a key ring, and that can be readily and quickly retrieved when needed, thereby reducing tire theft and automobile vandalism.

A wheel lock disclosed herein, having a plurality of embodiments, is a novel and non-obvious invention that meets the needs that are described above, while providing many substantial advantages such as, but not limited to, reducing tire theft and vehicle vandalism, permitting the use of a standard key to lock/unlock a wheel with an attached tire from an automobile and decreasing the costs—financial and otherwise—associated with vandalism.

An embodiment of the present invention forms, in part, a structure having screw threading or the like that permits the invention to function, in part, as a lug nut, thereby allowing the invention to fasten onto a lug bolt. An embodiment can further include a locking mechanism, such as a miniature tubular cam lock or the like, that permits the invention to lock onto a lug bolt, thereby securing the invention to the lug bolt and preventing the invention from being removed from the lug bolt without the use of a proper key.

Therefore, the present invention can be fastened onto a lug bolt, for example, through the use of screw threading. When torque is applied to the invention, such as via a standard lug wrench, the interaction between screw threading of the invention and of the lug bolt causes the invention to fasten onto the lug bolt. Once the invention is fastened to the lug bolt, the invention can be locked thereto via the locking mechanism, thereby preventing the wheel and attached tire from being removed from the automobile. However, when the locking mechanism is unlocked, the invention can be unfastened and removed from the lug bolt, thereby permitting the wheel with attached tire to be dismounted and removed from the automobile.

The locking mechanism of the present invention utilizes a standard key, such as a key used in connection with a pin tumbler lock or the like, to lock or to unlock the present invention. The key can be stored in a convenience location, such as on a key chain, in a purse, on a person's body or in some other area or location besides the interior of an automobile.

Because the key can be stored in essentially any convenient location due to its relatively small size, weight and shape, when it becomes necessary to lock/unlock the present invention so as to either mount or dismount a wheel with attached tire from an automobile because, for example, of a flat tire, the key can be retrieved quickly and easily. Moreover, because the key is not stored in an area that is inside an automobile, the likelihood of automobile vandalism is reduced because would-be thieves are less likely to burglarize an automobile in the process of stealing one or more tires because the key is not likely located inside the automobile.

To secure and lock a wheel with attach tire to an automobile using the present invention, first, the wheel with attached tire is physically mounted onto an automobile. Typically a plurality of lug bolts that protrude from an automobile's wheel hub assembly is aligned with a plurality of apertures formed by a wheel that receive the lug bolts. The apertures receive the lug bolts, and the lug bolts are passed through the apertures. Then, save for one lug bolt, a lug nut is placed on each lug bolt and fastened tightly thereon usually via screw threading as torque is applied. The present invention is fastened onto a lug bolt (i.e., the one lug bolt on which a lug nut was not fastened thereto as noted above) in a similar fashion and in a similar way as that of a standard lug nut. While a typical automobile may comprise a plurality of lug bolts that are secured to each wheel via lug nuts as noted above, it is envisioned that the present invention is used in place of a lug nut for a given wheel and that standard lug nuts are used with other lug bolts, if any, for that given wheel.

Once the present invention is fastened to the lug bolt via applied torque, a key can be used to lock the present invention thereon, thereby preventing the present invention from unfastening from the lug bolt and, as such, firmly securing the wheel with attached tire to the automobile's wheel hub assemble and, thus, to an automobile. To lock the present invention, a key associated with the present invention is inserted into the locking mechanism and is rotated or is otherwise engaged with the present invention to place the invention in the locked mode. When the present invention is in the locked mode, a portion of the exterior of the present invention can freely spins on its axis all the while firmly securing the wheel with attached tire to an automobile.

To unlock the present invention, the key associated with the present invention is inserted into the locking mechanism and is rotated or is otherwise engaged with the present invention to place the invention in the unlocked mode. When the present invention is in the unlocked mode, the exterior of the present invention ceases to freely spin on its axis. Then, torque can be applied to the exterior of the present invention via a standard lug wrench, and the invention can be unfastened and removed from the lug bolt. If necessary, other standard lug nuts may also be unfastened and removed from the lug bolts for a particular wheel, also via a standard lug wrench. When all the lug nuts as well as the present invention have been unfastened and removed from the lug bolts associated with a particular wheel, the wheel with attached tire can be physically dismounted and removed from an automobile.

DETAILED DESCRIPTION

While the embodiments of the present application are susceptible to various modifications and alternative forms, specific embodiments thereof are shown by way of example in the drawings and are herein described in detail. It should be understood, however, that the description herein of specific embodiments is not intended to limit the present invention to the particular embodiment disclosed, but on the contrary, the intention is to cover all modifications, equivalents and alternatives falling within the spirit and scope of the present application.

Illustrative embodiments of the present invention are provided below. It will, of course, be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to FIG. 1, an illustration is shown that depicts a perspective view of a wheel lock 100 for an automobile, an embodiment of the present invention. The wheel lock 100 can comprise a pin tumbler lock 110 or the like, a coaxially rotatable tubular sleeve 120 and a coaxially rotatable tubular core 130. Artisans skilled in this art will appreciate that the pin tumbler lock 110 can be a tubular pin tumbler lock, a cylinder pin tumbler lock or any lock that functions in a like manner. The sleeve 120 is configured to receive the core 130. The rotatable tubular sleeve 120 and the coaxially rotatable tubular core 130 can be comprised of alloy steel. Further, the exterior of the sleeve 120 can define a hexagonal-shaped portion 140 or other design that is necessary for proper interaction with a standard lug nut, thereby permitting the wheel lock 100 to interact and/or engage with a standard lug wrench for fastening/unfastening of the wheel lock 100 onto/from a lug bolt. Additionally, positioned on the front portion of the wheel lock 100, the pin tumbler lock 110 can define a key chamber 150 for receiving, interacting and/or engaging a key, such as, but not limited to, a tubular key. A key is used to lock and unlock the pin tumbler lock 110, which, in turn, locks and unlocks the wheel lock 100.

Figure 2:
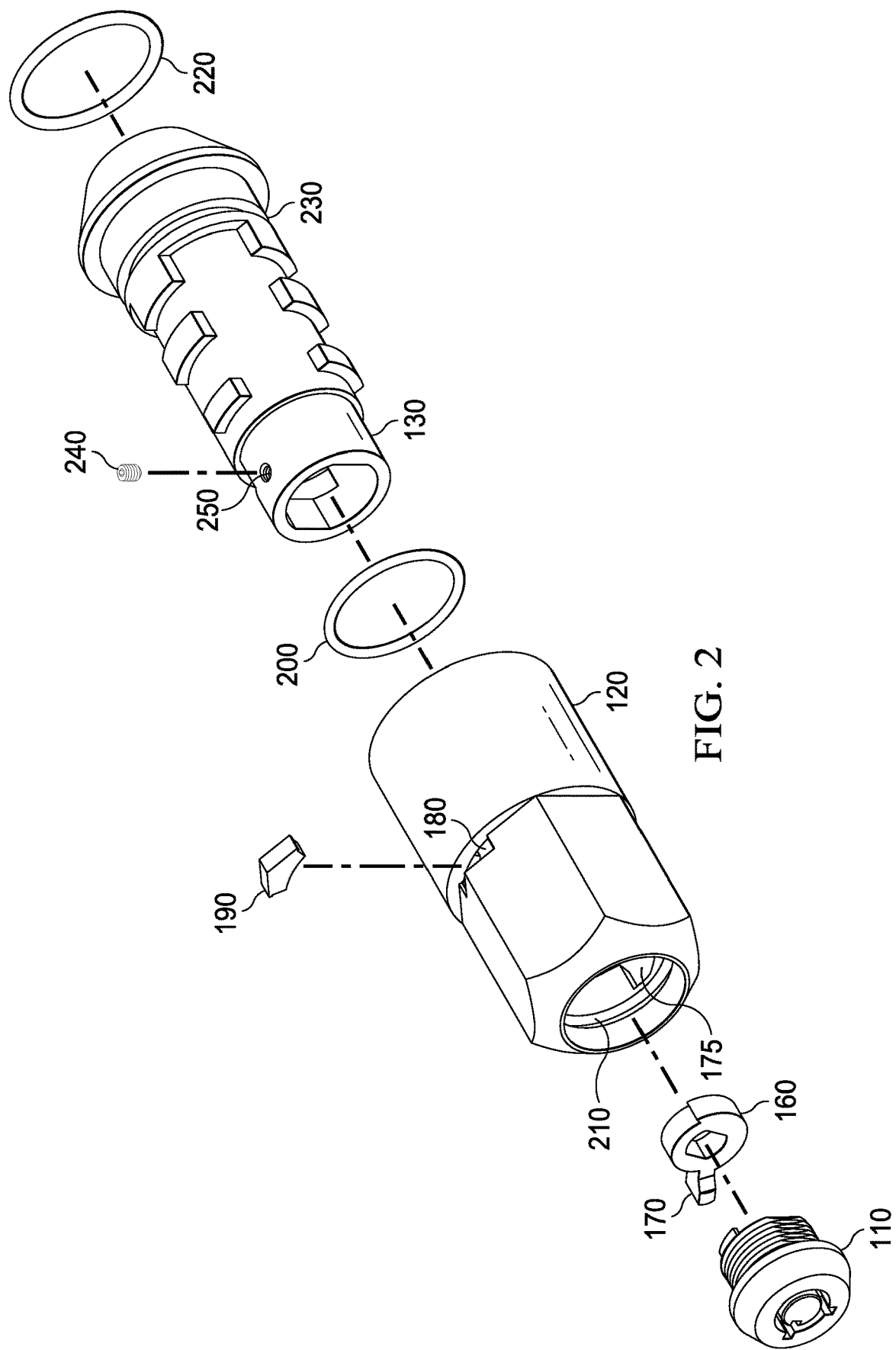
FIG. 2 is an exploded view of the embodiment of the present invention of FIG. 1.

FIG. 2 depicts an exploded view of the wheel lock 100. As shown, the wheel lock 100 can comprise a pin tumbler lock 110 that engages a cam 160. The cam 160 includes a tab 170, which protrudes outward therefrom and which interacts with a tab cavity 175 that is defined by the sleeve 120 and that is defined in the interior thereof. The cam 160 can engage with the pin tumbler lock 110 via an actuator such as a camshaft or the like, such that the rotation of the actuator from the pin tumbler lock 110 can cause the cam 160 to rotate. The tab 170 of the cam 160 also can engage with the sleeve 120. Thus, as the cam 160 is rotated via the pin tumbler lock 110, the tab 170 of the cam 160 rotates about the same axis as the cam 160 and impacts the sleeve 120 via the tab cavity 175, thereby causing the sleeve 120 to interact with the core 130 such that the sleeve 120 is moved and repositioned in its engagement with the core 130.

Further, as shown in FIG. 2, the sleeve 120 of the wheel lock 100 can define a retention slug chamber 180 that receives a retention slug 190. The retention slug 190, which can be press-fitted into the retention slug chamber 180, prevents the sleeve 120 from completely disengaging from the core 130 while permitting the sleeve 120 to be repositioned in its engagement with the core 130 when the tumbler lock 110 is placed in either the locked or unlocked position. Thus, the retention slug 190 holds the sleeve 120 and core 130 together. Additionally, as shown in FIG. 2, the wheel lock 100 can include an O-ring 200 that fits into an O-ring cavity 210 defined by the sleeve 120, and an O-ring 220 that fits into an O-ring cavity 230 defined by the core 130. The O-rings 200, 220 can be made of rubber or other like material, so as to provide a seal to prevent liquid or other material from entering into and seizing the wheel lock 100. The wheel lock 100 also can include a set screw 240 that can screw into the set screw chamber 250 that is defined by the core 130. The set screw 240 aids in securing the tumbler lock 110 to the sleeve 120, and, thus, to the wheel lock 100.

Figure 3:
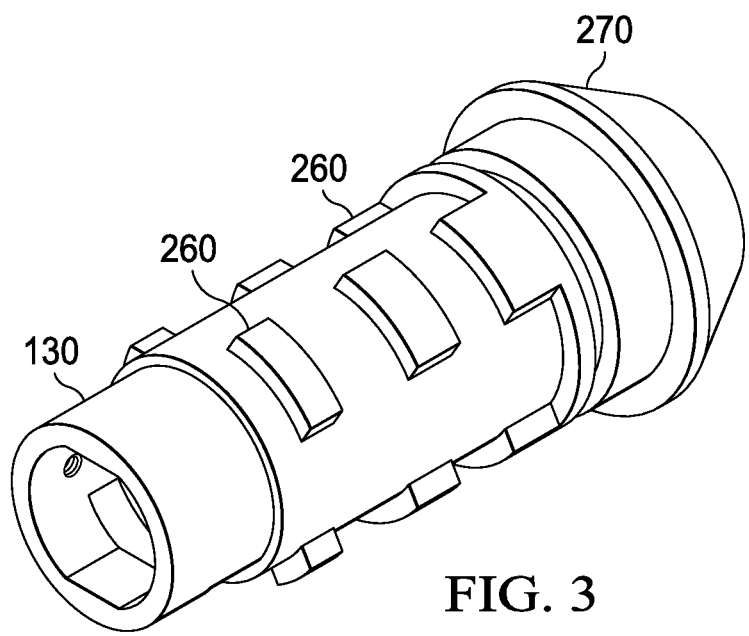
FIG. 3 is a perspective view of a coaxially rotatable tubular core of the embodiment of the present invention of FIG. 1.

Turning to FIG. 3, the core 130 is shown having a plurality of core ridges 260 on its exterior surface that function as impact segments. The plurality of core ridges 260 are distributed and spaced evenly upon the surface of the exterior of the core 130. For purposes of example only and without limitation, in the embodiment of the present invention shown in FIG. 3, the exterior of the core 130 comprises nine (9) evenly spaced and distributed core ridges 260. Further, the core 130 can include a conical seat 270 attached thereto, which aids in supporting the abutment of the wheel lock 100 against a wheel disc or other wheel assembly after it is fastened onto a lug bolt. The conical seat 270 can be made of rubber or other like material.

Figure 4:
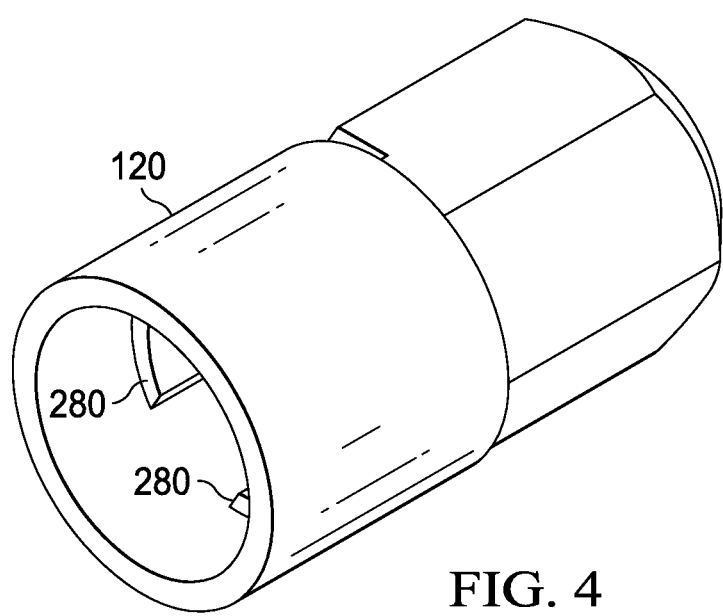
FIG. 4 is a perspective view of a coaxially rotatable tubular sleeve of the embodiment of the present invention of FIG. 1.

FIG. 4 illustrates a perspective view of the sleeve 120 showing the end portion thereof that engages with the core 130. As shown, the interior surface of the sleeve 120 can comprise a plurality of sleeve ridges 280 that function as impact segments. The plurality of sleeve ridges 280 are distributed and spaced evenly upon the surface of the interior of the sleeve 120. For purposes of example only and without limitation, in the embodiment of the present invention described herein, the interior of the sleeve 120 comprises nine (9) evenly spaced and distributed sleeve ridges 280. The sleeve ridges 280 of the sleeve 120 are similar in design and function to the core ridges 260 of the core 130.

When the wheel lock 100 is in the unlocked position (via the tumbler lock 110), the sleeve ridges 280 and the core ridges 260 impact one another, thereby preventing the sleeve 120 from free spinning. When the sleeve ridges 280 and the core ridges 260 impact one another, the wheel lock 100 can be fastened to or removed from a lug bolt via a standard lug wrench or other similar tool. Using a standard lug wrench, torque is applied to the sleeve 120, which, in turn, is transferred to the core 130 via the impact segments of the sleeve ridges 280 and core ridges 260 that are abutting one another. As a result, the wheel lock 100 can be fastened to or removed from a lug bolt.

When the wheel lock 100 is in the locked position (via the tumbler lock 110), the sleeve ridges 280 and the core ridges 260 do not impact one another, thereby permitting the sleeve 120 to free spin. When the sleeve ridges 280 and the core ridges 260 do not impact one another, the sleeve 120 can spin on its axis at will while transferring no force (torque) to the core 130. As a result, if a standard lug wrench or other tool interacts with a locked wheel lock 100, the sleeve 120 will spin on its axis, but the core 130 of the wheel lock 100 will remain affixed to the lug bolt, thereby causing the wheel lock 100 to remain affixed to the lug bolt.

When the wheel lock 100 is placed in the unlocked position, the tab 170 from the cam 160 moves about the axis of the cam 160 (as a result of the rotation caused by the tumbler lock 110 via a key) and impacts the sleeve 120 via the sleeve cavity 175, thereby causing the sleeve 120 to move in a linear fashion with respect to the core 130. More specifically, the sleeve 120 slidably engages with the core 130. Thus, the sleeve 120 slides forward so that the sleeve ridges 280 of the sleeve 120 impact the core ridges 260 of the core 130, thereby transferring any torque that is applied to the sleeve 120 to the core 130. However, conversely when the wheel lock 100 is placed in the locked position, the tab 170 from the cam 160 moves in an opposite direction about the axis of the cam 160 (as a result of the opposite rotation caused by the tumbler lock 110 via a key) and impacts the sleeve 120 via the sleeve cavity 175, thereby causing the sleeve 120 to move in an opposite linear fashion with respect to the core 130. Thus, the sleeve 120 slides backward so that the sleeve ridges 280 of the sleeve 120 do not impact the core ridges 260 of the core 130. It should be noted that because the plurality of core ridges 260 on the exterior surface of the core 130 and the plurality of sleeve ridges 280 on the interior surface of the sleeve 120 are distributed and spaced evenly upon the respective surfaces, the core ridges 260 and the sleeve ridges 280 do not impact one another when the wheel lock 100 is placed in the locked position because the core ridges 260 and the sleeve ridges 280 pass through the spaces (plains) that exist between the core ridges 260 and between the sleeve ridges 280. Thus, as the sleeve 120 free spins about its axis, the core ridges 260 and the sleeve ridges 280 do not impinge upon one another.

Figure 5:
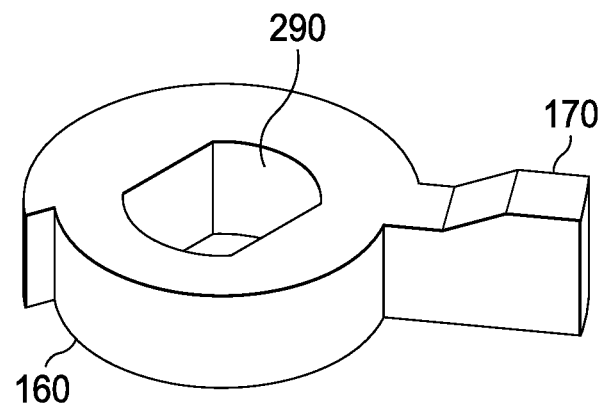
FIG. 5 is a perspective view of a cam having a tab attached thereto of the embodiment of the present invention of FIG. 1.

Turning to FIG. 5, a cam 160 is shown with a tab 170. The cam aperture 290 defined by the cam 160 permits interaction by the cam 160 with a tumbler lock 110 via an actuator or the like that is designed and formed to engage with the cam 160, so that when a key is utilized with the tumbler lock 110, torque is applied to the cam 160, which, in turn, causes the tab 170 to move in a circular fashion about the axis of the cam aperture 160. The tab 170, in turn, engages a tab cavity 175 on the interior surface of the sleeve 120 that is defined by the sleeve 120. When the tab 170 moves in a circular direction about the axis of the cam aperture 290, the tab 170 engages the sleeve 120 via the tab cavity 175 and causes the sleeve 120 to move in a linear direction relative to the core 130.

Figure 6:
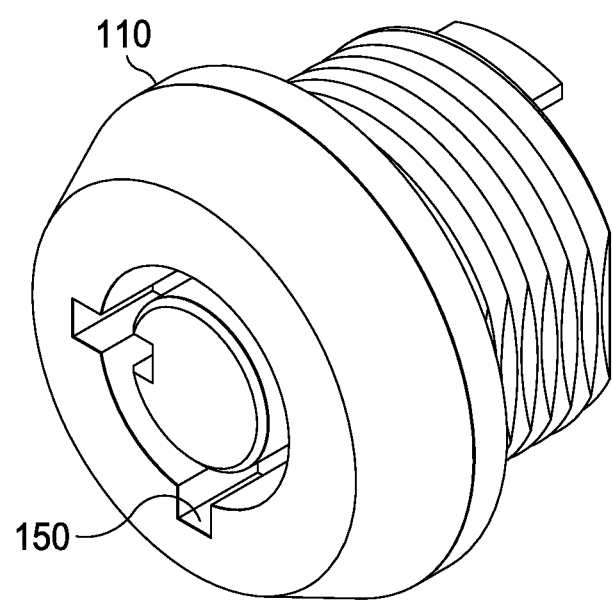
FIG. 6 is a tubular pin tumbler lock of the embodiment of the present invention of FIG. 1.

FIG. 6 shows a perspective view of a pin tumbler lock 110 defining a key chamber 150. While the embodiment of the present invention described herein utilizes a tubular pin tumbler lock, persons of ordinary skill in the art will appreciate that the lock is not limited to what is shown and described herein but can be any type of lock or locking mechanism/locking system that can engage the present invention such that when the present invention is placed in a locked position, the locking mechanism engages a sleeve 120, causing the sleeve 120 to move in a linear direction relative to the core 130.

Figure 7A:
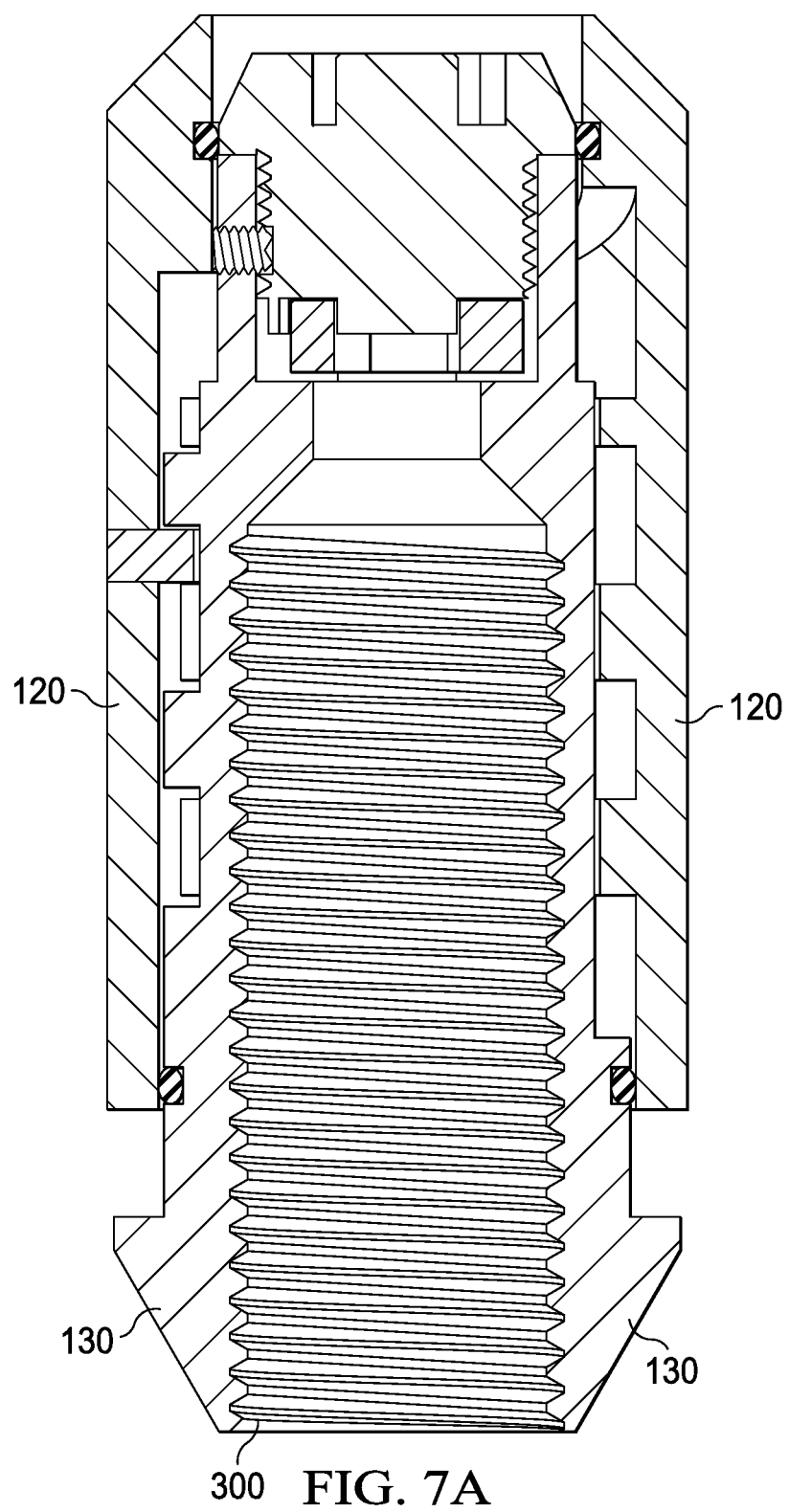
FIG. 7A is cross-section view of Section 7A in FIG. 1 wherein the wheel lock is in the locked position.
Figure 7B:
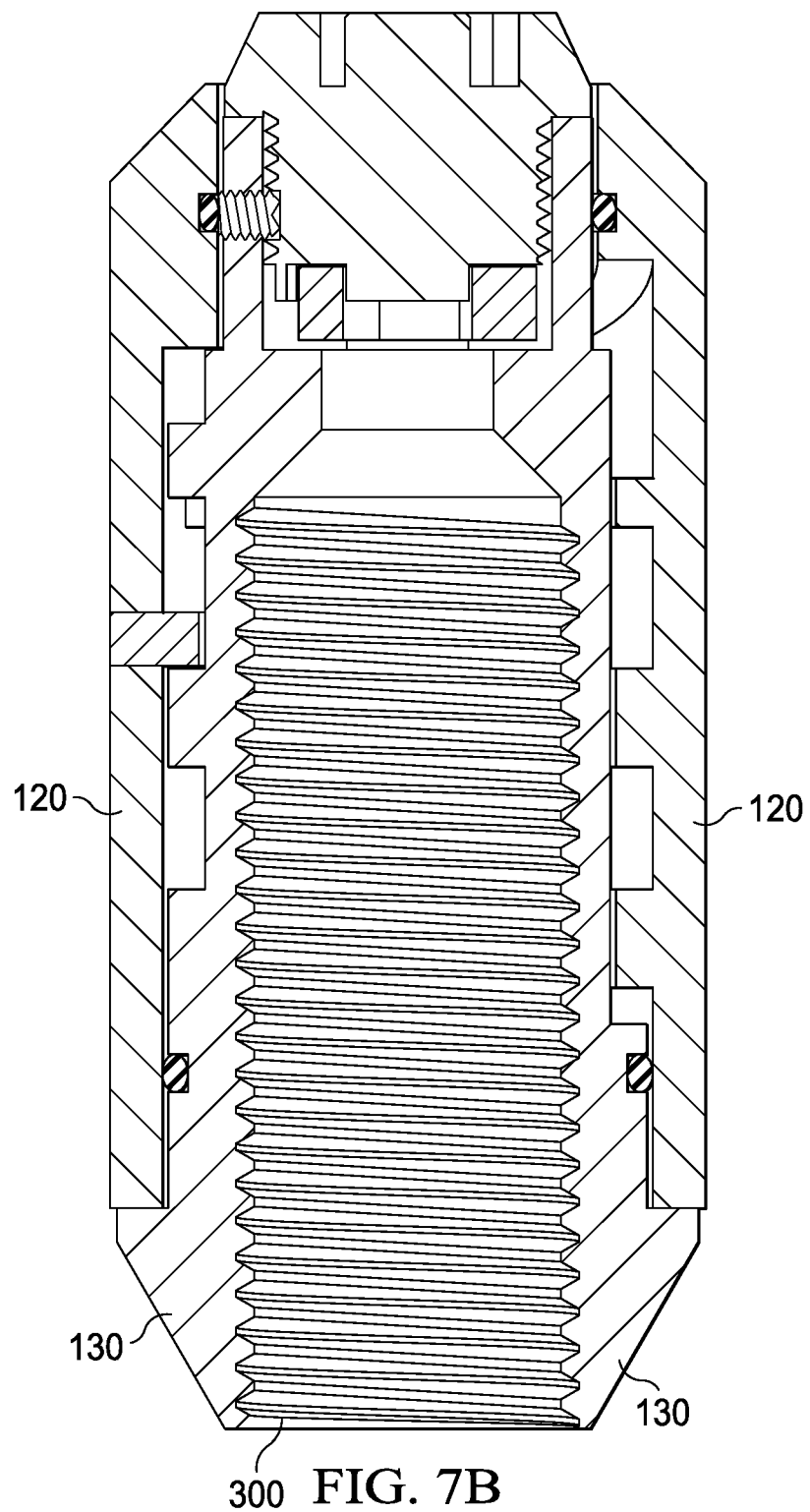
FIG. 7B is a cross-section view of the embodiment of the present invention of FIG. 1 wherein the wheel lock is in the unlocked position.

FIGS. 7A and 7B depict a cross-section of the wheel lock 100 in a locked and an unlocked position, respectively. In FIGS. 7A and 7B, the core 130 defines a threaded aperture 300 within its interior, thereby permitting the core 130 to fasten onto a standard lug bolt via the threaded aperture 300. FIG. 7A shows the sleeve 120 in a position relative to the core 130, and FIG. 7B shows the sleeve 120 in a different position relative to the core 130 such that the sleeve 120 moves in a linear direction along the core 130.

Figure 8A:
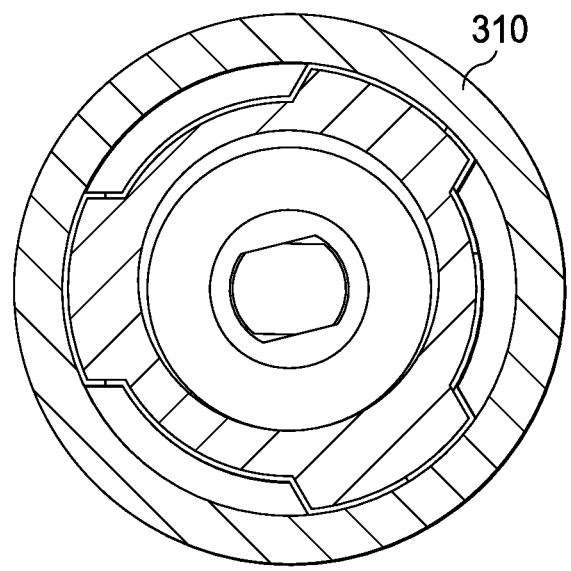
FIG. 8A is a front view of the embodiment of the present invention of FIG. 1 wherein the wheel lock is in the locked position.
Figure 8B:
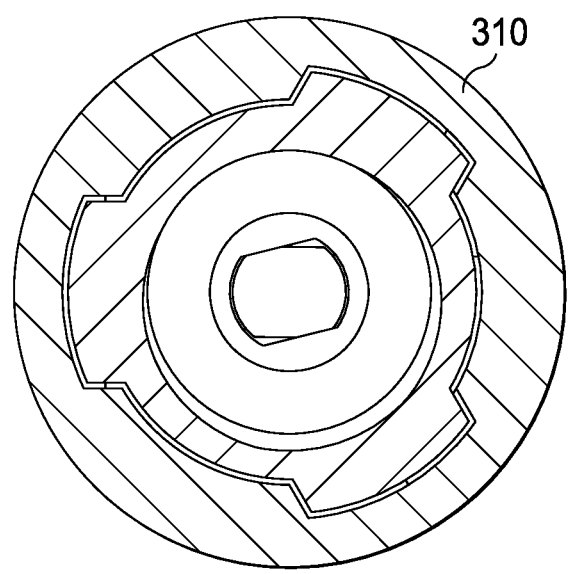
FIG. 8B is a front view of the embodiment of the present invention of FIG. 1 wherein the wheel lock is in the unlocked position.
Figure 9:
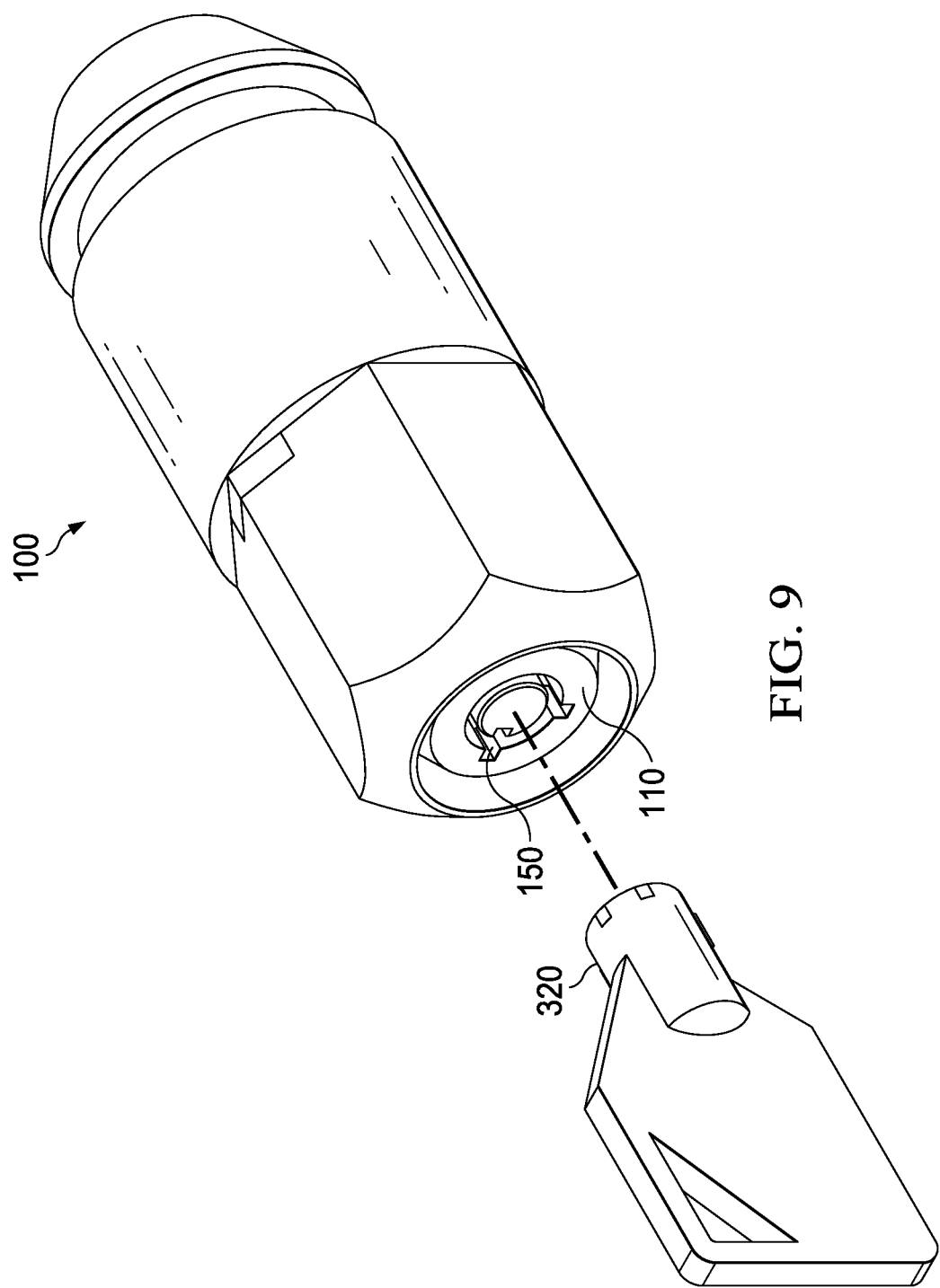
FIG. 9 is a perspective view of the embodiment of the present invention of FIG. 1 wherein a tubular key is interacting therewith.

FIGS. 8A and 8B illustrate the exterior face 310 of the tumbler lock 110 when the wheel lock 100 is in a locked position and in an unlocked position, respectively. FIG. 9 shows a tubular key 320 that interacts with the tumbler lock 110 of the wheel lock 100. In the present embodiment described, the key 320 can be inserted into the key chamber 150, and rotated to lock or unlock the wheel lock 100. While FIG. 9 depicts a tubular key 320, persons of skill in the art will appreciate that any type of key, having any design, shape or size, whether mechanical in nature or digital in nature, can be used with the wheel lock 100.

Figure 10:
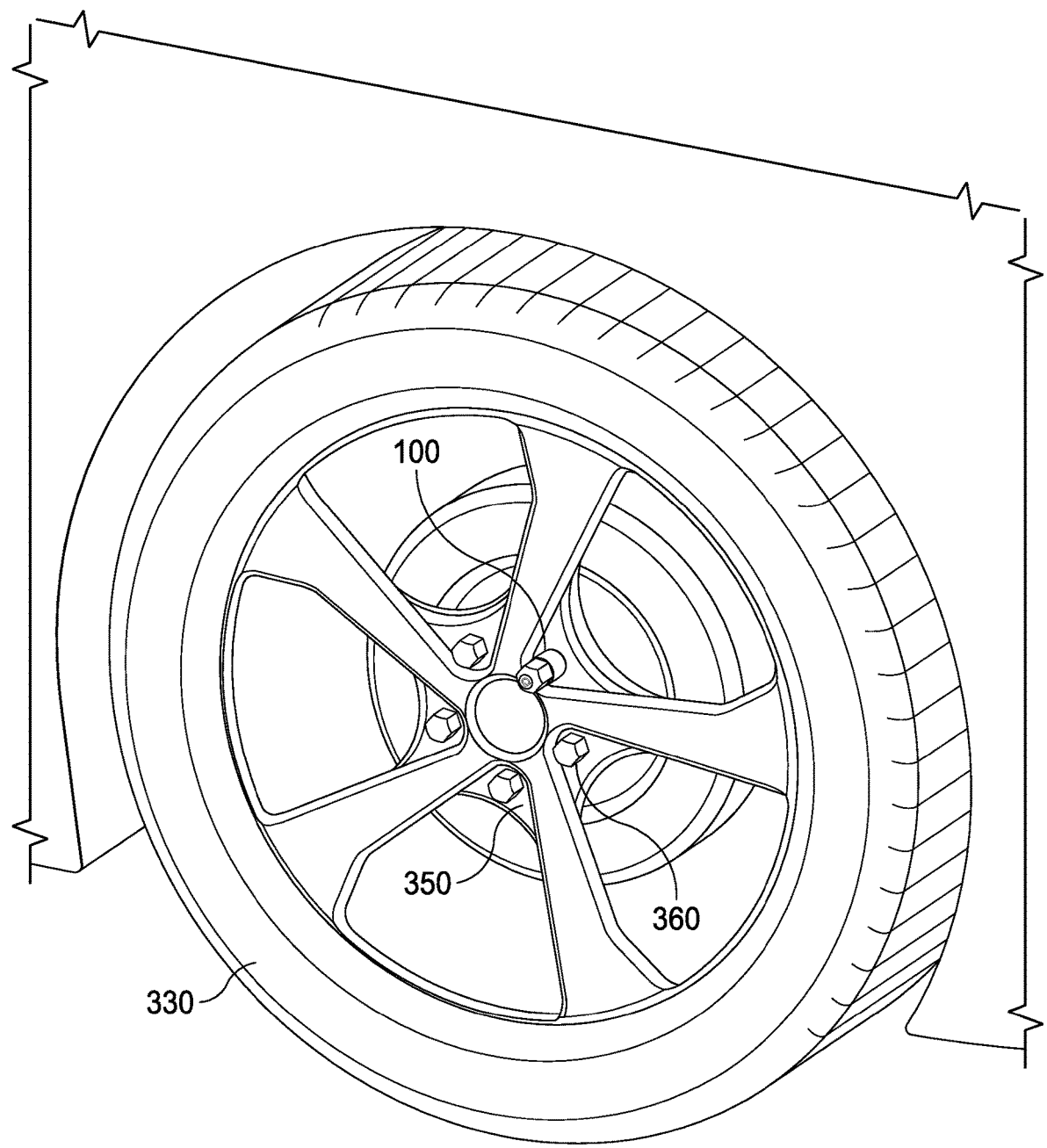
FIG. 10 is a perspective view of the embodiment of the present invention of FIG. 1 showing the wheel lock in use on an automobile, securing a tire with attached rim to an automobile.

FIG. 10 shows the wheel lock 100 in use. A tire 330 with attached rim is fastened to a wheel 350 via the wheel lock 100 along with a plurality of lug nuts 360. The wheel lock 100 is in the locked position, thereby preventing the tire 330 from being removed from an automobile without unlocking the wheel lock 100.

The particular embodiments disclosed herein are illustrative only, as the embodiments may be modified and practiced in different but equivalent manners apparent to those skilled in the art having the benefit of the teachings herein. It is, therefore, evident that the particular embodiments disclosed herein may be altered or modified, and all such variations are considered within the scope and spirit of the present invention.

Although many embodiments of the present invention have been illustrated in the accompanying Drawings and described in the foregoing Detailed Description, it should be understood that the present invention is not limited to the embodiments disclosed, but is capable of numerous rearrangements, modifications, and substitutions of parts and elements without departing from the spirit of the invention.

What is claimed is:

1. A wheel lock for an automobile, the wheel lock comprising:
   a pin tumbler lock for locking and unlocking the wheel lock;
   a cam that engages with the pin tumbler lock through an actuator, the cam having a tab that protrudes outward therefrom;
   a coaxially rotatable tubular sleeve that is configured to receive the pin tumbler lock and the cam and that engages with the tab of the cam to transform torque that results from the locking and unlocking of the pin tumbler lock into linear movement by the coaxially rotatable tubular sleeve, the interior of the coaxially rotatable tubular sleeve defining a tab cavity that engages the tab of the cam and having a plurality of sleeve ridges thereon that are distributed and spaced evenly, the exterior of the coaxially rotatable tubular sleeve defining a portion thereof that is capable of interacting with a standard lug wrench; and
   a coaxially rotatable tubular core that is configured to receive the coaxially rotatable tubular sleeve and that slidably engages therewith, the exterior of the coaxially rotatable tubular core having a plurality of core ridges that are distributed and spaced evenly thereon that engage with the sleeve ridges of the coaxially rotatable tubular sleeve when the pin tumbler is unlocked thereby permitting torque that is applied to the exterior of the wheel lock to be transferred to the coaxially rotatable tubular core to permit the wheel lock to be fastened to or unfastened from a lug bolt, the interior of the coaxially rotatable tubular core defining a threaded aperture for permitting the wheel lock to fasten onto or unfasten from a lug bolt, the coaxially rotatable tubular core having a seat attached thereto that aids in supporting the abutment of the wheel lock against a wheel disc after the wheel lock has been fastened onto a lug bolt.

2. The wheel lock of claim 1 wherein the exterior of the coaxially rotatable tubular sleeve defines a hexagonal-shaped portion that is capable of interacting with a standard lug wrench.

3. The wheel lock of claim 1 wherein the pin tumbler lock is a tubular pin tumbler lock.

4. The wheel lock of claim 3 wherein the interior of the coaxially rotatable tubular sleeve defines an O-ring cavity and the exterior of the coaxially rotatable tubular core defines an O-ring cavity.

5. The wheel lock of claim 4 further comprising an O-ring that sits in the O-ring cavity of the coaxially rotatable tubular sleeve and an O-ring that sits in the O-ring cavity of the coaxially rotatable tubular core.

6. The wheel lock of claim 5 wherein the O-ring that sits in the O-ring cavity of the coaxially rotatable tubular sleeve and the O-ring that sits in the O-ring cavity of the coaxially rotatable tubular core are comprised of rubber.

7. The wheel lock of claim 6 wherein the seat of the coaxially rotatable tubular core is conical in design.

8. The wheel lock of claim 7 wherein the seat is comprised of rubber.

9. A kit of parts for locking a wheel to an automobile, the kit of parts comprising:
   a key;
   a pin tumbler lock that interacts with the key to lock and to unlock the pin tumbler lock;
   a cam that engages with the pin tumbler lock through an actuator, the cam having a tab that protrudes outward therefrom;
   a coaxially rotatable tubular sleeve that is configured to receive the pin tumbler lock and the cam and that engages with the tab of the cam to transform torque that results from the locking and unlocking of the pin tumbler lock into linear movement by the rotatable tubular sleeve, the interior of the coaxially rotatable tubular sleeve defining a tab cavity that engages the tab of the cam and having a plurality of sleeve ridges thereon that are distributed and spaced evenly, the exterior of the coaxially rotatable tubular sleeve defining a portion thereof that is capable of interacting with a standard lug wrench; and
   a coaxially rotatable tubular core that is configured to receive the coaxially rotatable tubular sleeve and that slidably engages therewith, the exterior of the coaxially rotatable tubular core having a plurality of core ridges that are distributed and spaced evenly thereon that engage with the sleeve ridges of the coaxially rotatable tubular sleeve when the pin tumbler is unlocked thereby permitting torque that is applied to the exterior of the wheel lock to be transferred to the coaxially rotatable tubular core to permit the wheel lock to be fastened to or unfastened from a lug bolt, the interior of the coaxially rotatable tubular core defining a threaded aperture for permitting the wheel lock to fasten onto or unfasten from a lug bolt, the coaxially rotatable tubular core having a seat attached thereto that aids in supporting the abutment of the wheel lock against a wheel disc after the wheel lock has been fastened onto a lug bolt.

10. The kit of parts of claim 9 wherein the exterior of the coaxially rotatable tubular sleeve defines a hexagonal-shaped portion that is capable of interacting with a standard lug wrench.

11. The kit of parts of claim 10 wherein the pin tumbler lock is a tubular pin tumbler lock.

12. The kits of parts of claim 11 wherein the key is a tubular key.

13. The kit of parts of claim 12 wherein the interior of the coaxially rotatable tubular sleeve defines an O-ring cavity and the exterior of the coaxially rotatable tubular core defines an O-ring cavity.

14. The kit of parts of claim 13 further comprising an O-ring that sits in the O-ring cavity of the coaxially rotatable tubular sleeve and an O-ring that sits in the O-ring cavity of the coaxially rotatable tubular core.

15. The kit of parts of claim 14 wherein the O-ring that sits in the O-ring cavity of the coaxially rotatable tubular sleeve and the O-ring that sits in the O-ring cavity of the coaxially rotatable tubular core are comprised of rubber.

16. The kit of parts of claim 15 wherein the seat of the coaxially rotatable tubular core is conical in design.

17. The kit of parts of claim 16 wherein the seat is comprised of rubber.

18. A wheel lock for an automobile, the wheel lock comprising:
   a tubular pin tumbler lock for locking and unlocking the wheel lock;
   a cam that engages with the tubular pin tumbler lock through an actuator, the cam having a tab that protrudes outward therefrom;
   a coaxially rotatable tubular sleeve that is configured to receive the tubular pin tumbler lock and the cam and that engages with the tab of the cam to transform torque that results from the locking and unlocking of the tubular pin tumbler lock into linear movement by the coaxially rotatable tubular sleeve, the interior of the coaxially rotatable tubular sleeve defining a tab cavity that engages the tab of the cam and an O-ring cavity for receiving an O-ring and having a plurality of sleeve ridges thereon that are distributed and spaced evenly, the exterior of the coaxially rotatable tubular sleeve defining a hexagonal-shaped portion thereof that is capable of interacting with a standard lug wrench;
   a coaxially rotatable tubular core that is configured to receive the coaxially rotatable tubular sleeve and that slidably engages therewith, the exterior of the coaxially rotatable tubular core defining an O-ring cavity for receiving an O-ring and having a plurality of core ridges that are distributed and spaced evenly thereon that engage with the sleeve ridges of the coaxially rotatable tubular sleeve when the tubular pin tumbler is unlocked thereby permitting torque that is applied to the exterior of the wheel lock to be transferred to the coaxially rotatable tubular core to permit the wheel lock to be fastened to or unfastened from a lug bolt, the interior of the coaxially rotatable tubular core defining a threaded aperture for permitting the wheel lock to fasten onto or unfasten from a lug bolt, the coaxially rotatable tubular core having a conical-shaped seat attached thereto that is comprised of rubber and that aids in supporting the abutment of the wheel lock against a wheel disc after the wheel lock has been fastened onto a lug bolt;
   an O-ring that sits into the O-ring cavity of the coaxially rotatable tubular sleeve and that is comprised of rubber; and
   an O-ring that sits into the O-ring cavity of the coaxially rotatable tubular core and that is comprised of rubber.

* * * * *